Jan. 15, 1924.

H. A. DANFORTH 1,481,051

SHOCK ABSORBER

Filed Sept. 18, 1920 2 Sheets-Sheet 1

Inventor,
Harland A. Danforth,
by Frank G. Hattie
His Attorney.

Jan. 15, 1924.
H. A. DANFORTH
SHOCK ABSORBER
Filed Sept. 18, 1920   2 Sheets-Sheet 2
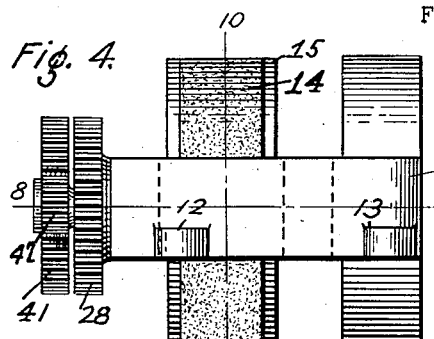
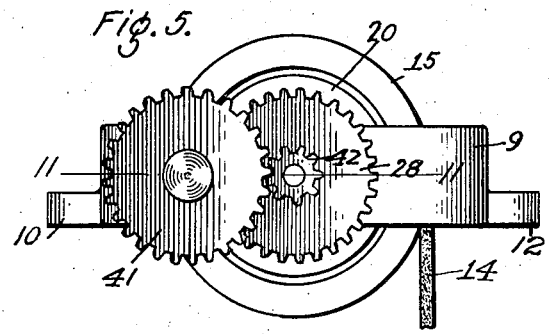
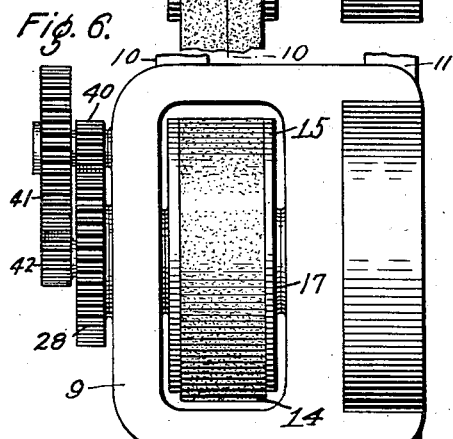
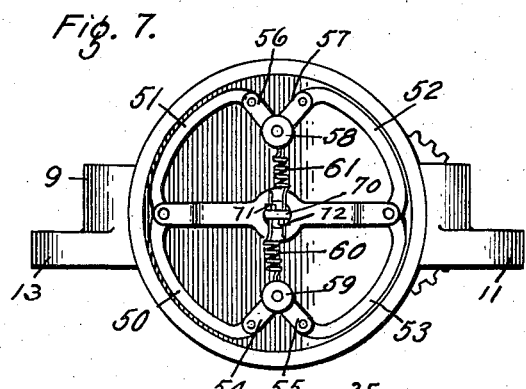
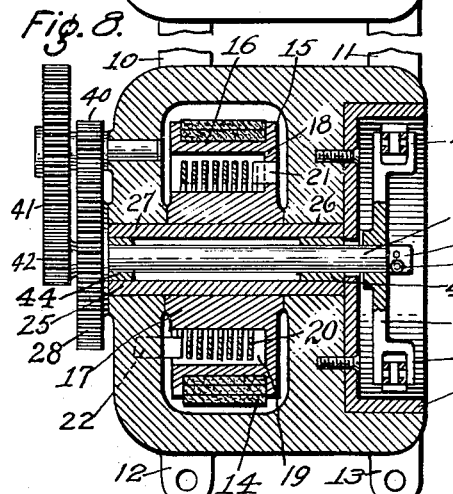
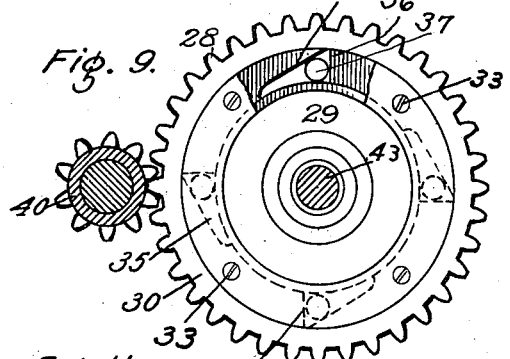
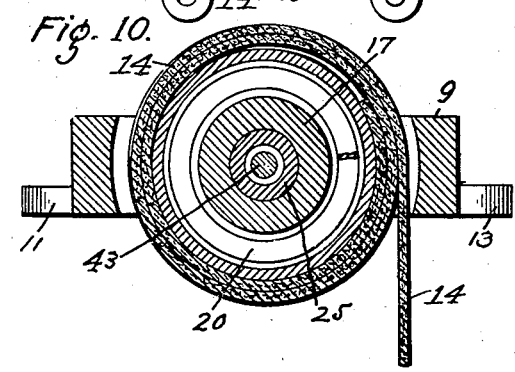
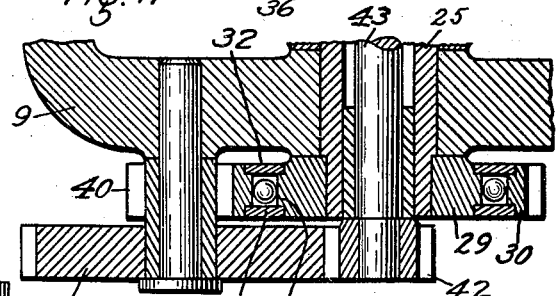
Inventor,
Harland A. Danforth,
by Frank G. Hattie
His Attorney Patented Jan. 15, 1924.

1,481,051

UNITED STATES PATENT OFFICE.

HARLAND A. DANFORTH, OF LYNN, MASSACHUSETTS.

SHOCK ABSORBER.

Application filed September 18, 1920. Serial No. 411,060.

*To all whom it may concern:*

Be it known that I, HARLAND A. DANFORTH, a citizen of the United States, residing at Lynn, in the county of Essex and State of Massachusetts, have invented certain new and useful Improvements in Shock Absorbers, of which the following is a specification.

The invention relates to shock absorbers used on vehicles for absorbing the vibration and side thrust of the said vehicle during travel and consists of a device which will allow the free use of the supporting spring during the downward thrust of the body and a regulating device for controlling the upward thrust of the body, and to convert a violent shock into any easy cushioning movement. The invention is subject to my previous invention, Patent Number 1,352,724, issued Sept. 14, 1920, for improvements in shock absorbers.

The object of the invention is to provide a shock absorber which can be readily placed in position on any vehicle which will absorb or regulate the vibration of the body according to the intensity of the vibration and at the same time allow the free use of the supporting spring in its downward movement and regulate the disturbing and annoying thrust of the upward or side movement of the body.

Referring to the figures, Fig. 1 is a side elevation of a vehicle in which the shock absorbers are placed; Fig. 2 is a side elevation of the end of the chassis frame and wheel, with the shock absorber in position; Fig. 3 is an end elevation of a vehicle showing the position of the shock absorbers; Fig. 4 is a side elevation of the shock absorber; Fig. 5 is an end view of the same showing the gears for operating the regulating device; Fig. 6 is a plan view of the shock absorber; Fig. 7 is an end elevation showing the regulating device. Fig. 8 is a horizontal section taken on the line 8—8, Fig. 4.

Fig. 9 is a side view of the gears with the plate broken away, showing the one way driving or gripping mechanism.

Fig. 10 is a cross section showing the connecting belt and is taken on the line 10—10, Fig. 4.

Fig. 11 is an enlarged cross section of the gears taken on the line 11—11, Fig. 5.

Figure 1:
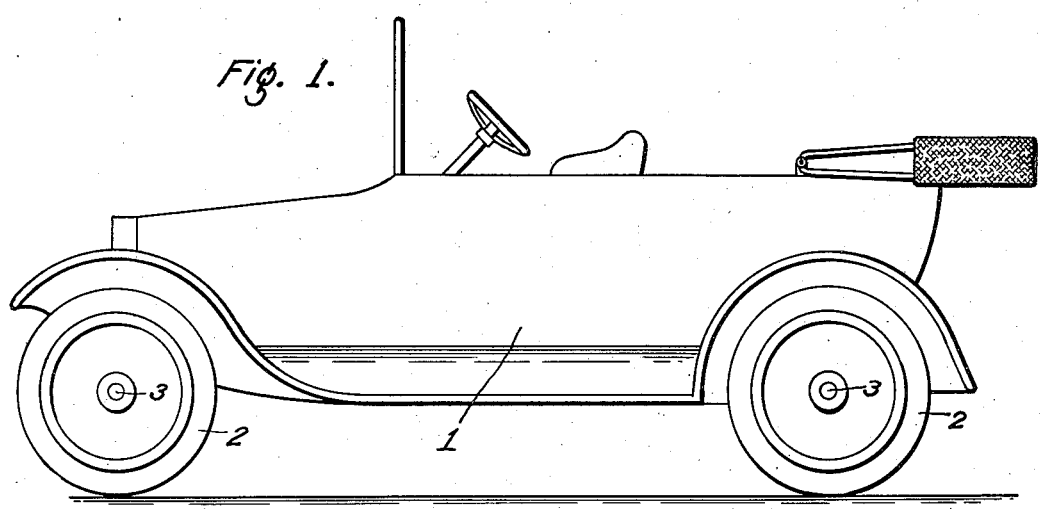
Figure 2:
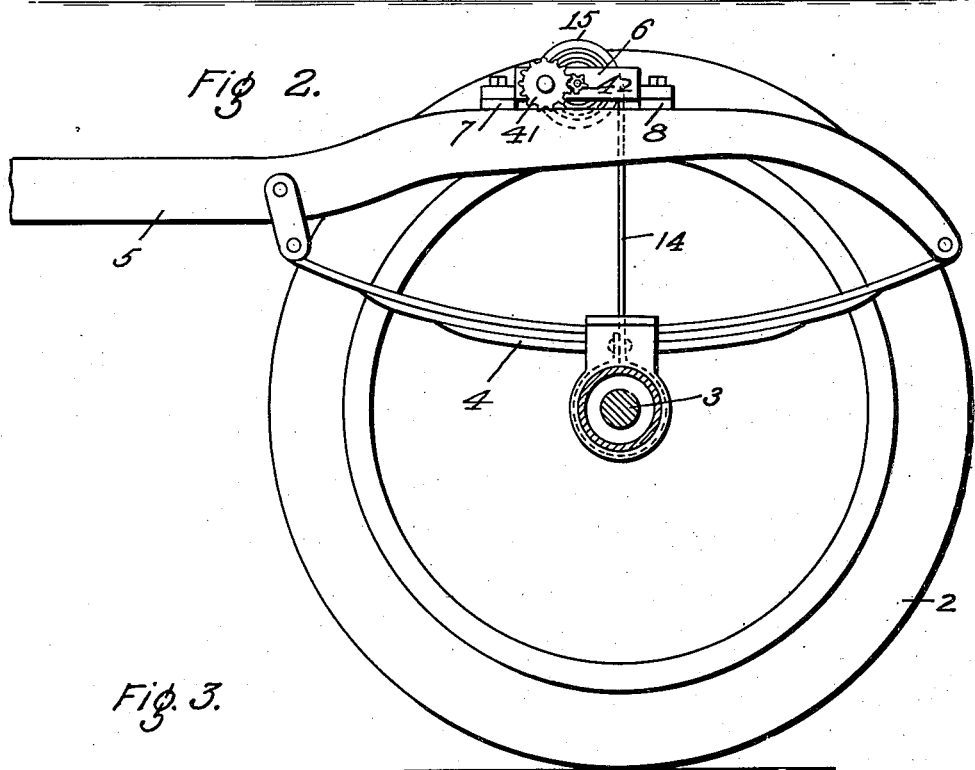
Figure 3:
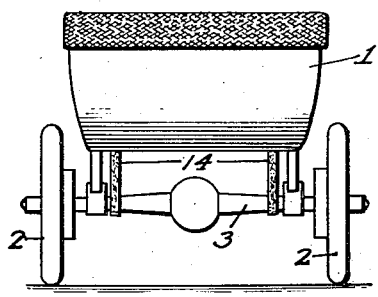

Referring to the drawings, the shock absorber is suitably secured to a vehicle having a body 1 supported by the wheels 2. The wheels 2 are rotatably mounted on the axles 3. Secured to the axles 3 are the springs 4 which form a flexible support for the body of the vehicle in relation to the wheels 2. The ends of the springs 4 are pivotally secured to the chassis frame 5. Mounted on the chassis frame 5 are two shock absorbers indicated by 6. As both shock absorbers are identical in construction, a description of one will be sufficient. The number of shock absorbers is not limited to two. Any number that is necessary can be used. It is a well known fact that the greatest number of vibrations take place on the rear wheels which causes the vehicle to be thrown about, especially if the said vehicle is unbalanced or of not sufficient load to hold it in place. On account of this fact I have shown two shock absorbers for controlling the vibration connected to the rear wheels. I have located the shock absorber as near the wheels as possible in order to obtain control of the side thrust and also the vibration caused by each wheel. For example, one of the wheels would be caused to vibrate vigorously, while the other wheel would remain in a normal balanced condition. This condition causes side thrusts and sways the car sideways as well as causing a bouncing movement to take place. Having the shock absorber in close proximity to each wheel allows the shock or thrust of the vehicle to be taken up by the nearest shock absorber, thereby eliminating bouncing and side swaying of the vehicle. The shock absorbers 6 are supported by two transverse bars 7 and 8, which are rigidly secured to the frame of the chassis 5. The embodiment of the invention lies almost wholly in detail of construction which consists of a yoke 9 for supporting the operating members of the shock absorber. Integral with the yoke 9 are four supporting lugs 10, 11, 12, and 13, which rest on and are bolted to the transverse arms 7 and 8, thereby forming a rigid support for the shock absorber. The movement of vibration of the wheels is communicated to the shock absorber 6 by leather or any suitable strap 14. One end of the strap 14 is secured to the axle 3. The opposite end of the strap is secured to the grooved wheel 15, forming a part of the shock absorber construction. The wheel 15 on its outer surface is provided with a wide groove 16 adapted to receive the strap 14. The grooved portion of the wheel 15 is connected to the hub 17 by the web 18, thereby forming a one-piece casting with a concentric chamber 19 between the grooved portion and the hub 17. Located in the concentric chamber 19 is an edgewise wound spring 20, one end of which is anchored in the wheel 15, as indicated at 21, and is free to rotate with the wheel while the opposite end is anchored in the rigid or stationary yoke 9 as shown at 22. By this construction the wheel 15 is rotated by the spring in one direction and the pull of the strap in the opposite direction, which imparts the operating movement to the shock absorber. That is, if the distance is shortened between the spring 4 and the chassis frame 5, the spring 20 instantly causes the wheel 15 to rotate, thereby winding up the strap 14 without interfering with the free use and the resilient benefit of the spring 4 to absorb the vibration of the body of the vehicle in its downward movement. As the vehicle rebounds and takes its upward movement the distance between the spring 4 and chassis frame 5 is increased, which causes the strap to unwind and impart a rotating movement to the shock absorber for regulating the vibration of the body in accordance with the intensity of the vibration. The wheel 15 is rigidly secured to the sleeve 25 which is free to rotate in the yoke 9 and is provided with bearings 26 and 27. The sleeve 25 is secured to gear 28 in such a manner as to cause it to rotate in one direction only. The gear 28 is composed of two parts one of which, as indicated by 29, is rigidly secured to the sleeve 25, the outer portion 30 having gear teeth thereon and is held in rotatable relation with the inner portion 29 by the side rings 31 and 32. The rings 31 and 32 are rigidly secured to the member 30 by the screws 33. The rings 31 and 32 extend over an annular projection 34, and retain the members in alignment. The inner surface of the member 30 rides on the projection 34, which retains the two gear members in concentric relation to each other. Cut in the portion 30 of the gear are four inclined surfaces 35 and a straight surface 36 which form a housing for the gripping balls 37. The balls 37 rest on the annular projection 34 and when the sleeve 25 and gear members 29 rotate in one direction the balls 37 are carried away from the inclined surface 35 and no movement of rotation is imparted to the outer gear member 30. When the sleeve 25 and inner gear member 29 rotate in the opposite direction, the balls 37 grip against the inclined surface 35 and cause the outer gear member 30 to rotate, which in turn communicates a rotating movement to the centrifugal device for controlling the vibration of the vehicle according to the intensity of the vibration; that is, when the vehicle body 1 depresses the supporting spring 4, the belt 14 is wound upon the grooved wheel 15, a distance equal to the amount of the drop of the vehicle body which allows the free functioning of the supporting spring to relieve the jar on the vibrating body. The gripping ball moves away from the inclined surface 35 and the centrifugal controlling device remains stationary. When the vehicle body moves upwardly carrying with it the shock absorber, and as the end of the strap 14 is fastened to the axle, the grooved wheel 15 is caused to rotate in the opposite direction which movement causes the ball 37 to grip against the inclined surface 35 which permits the outer gear member 30 to rotate. This movement of rotation is imparted to the gears 40, 41, 42, and the shaft 43. The shaft 43 is mounted on the bearing sleeves 44 and 45. Mounted on the opposite end of the shaft 43 is a regulating device which is enclosed in a casing 46 which is secured to the yoke 9 by screws as shown in Fig. 8. The regulating device consists of an arm 47 having yoked ends 48 and 49. Pivotally secured to the yoked ends 48 and 49 of the arm 47 are four brake shoes 50, 51, 52, and 53 which grip against the inner surface of the casing 46 at a predetermined time or according to a definite time in relation to the vibration of the vehicle. Pivotally secured to the opposite ends of the brake shoes 50, 51, 52, and 53 are connecting links 54, 55, 56, and 57, the opposite ends of which are pivotally secured to the governing balls or discs 58 and 59, which are held in adjustable relation to the shaft 43 by the springs 60 and 61. One end of the springs 60 and 61 is secured to governing discs or balls 58 and 59 respectively. The opposite ends the springs 60 and 61 are adjustably secured to the projection 70 forming an integral part of the shaft 43. The ends of the springs are threaded and are adapted to receive the nuts 71 and 72. By this construction the governing device is allowed to be adjusted according to tension of the spring to permit a variable gripping function of the shoes 50, 51, 52, and 53. It is obvious that the gripping surface or housing 30 always remains stationary excepting when the vehicle body is on the rebound, at which time the governing action takes place and regulates the rebound or vibration according to the intensity of the vibration.

In operation, the vehicle travels under usual or unusual road conditions which cause it to vibrate. The wheel 3 strikes a hole or hill which causes the vehicle to vibrate. Under these conditions the vehicle body 1 bears down and depresses the spring 4. This depressing movement causes the belt 14 to wind up on the grooved wheel 15 equal to the distance of depression. This movement does not in any way interfere on the pressure of the spring and it is the object of this invention not to retard the movement of the body against the supporting position of the spring, but to allow a full use to absorb the vibration of the body. On the rebound, or during the upward movement of the vehicle body, it is flexibly supported by the spring which causes a violent jolt and a sidewise thrust which is very annoying and disturbs the occupants of the vehicle. To prevent this the upward movement of the vehicle body or any increasing of the distance between the spring and the vehicle body causes the strap 14 to unwind, thereby causing the wheel 15 and sleeve 25 to rotate which moves the balls 37 against the gripping surfaces 35. This gripping movement causes the gears 40, 41, and 42 to rotate, which in turn rotate the shaft 43 and the brake shoes 50, 51, 52, and 53. When the brake shoes rotate, they are thrown outwardly by centrifugal force and grip against the inner surface of the housing 47, thereby holding the vehicle body in regulation to prevent jolting or jarring. That is, if the vehicle body on the rebound is allowed to be brought up with a jolt, it causes great discomfort to the occupants of the vehicle, and causes a great strain on the supporting members. The use of the device which embodies my invention, provides the free use of the supporting spring 4 in its downward movement, and on the rebound the body is in flexible support and comes up with a jerk. The device embodying my invention will take effect instantly on the upward movement and will regulate the vibration in accordance with its intensity.

In accordance with the provisions of the patent statutes, I have described the principles of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States is:

1. A shock absorber secured to a body and to a flexible support comprising a frame, a rotatable wheel mounted in the frame, a windable belt connected to the body and to the flexible support permitting a free movement of the flexible support in one direction and a centrifugal regulating means for controlling the upward movement of the body in accordance with the speed of movement of the said body.

2. A shock absorber secured to a body and to a flexible support comprising a frame, a rotatable wheel mounted in the said frame, a windable belt secured to the wheel and to the flexible support, a regulating device operated by the wheel for controlling the upward movement of the body, and a means connected to the rotatable wheel and regulating means for permitting a free movement of the flexible support in one direction and a regulating movement in the opposite direction in accordance with the speed of movement of the body.

3. A shock absorber secured to a body and to a flexible support comprising a frame, a rotatable wheel mounted in the said frame, a windable belt secured to the wheel and to the flexible support, a spring for rotating the wheel in one direction, the movement of the body rotating it in the opposite direction, a regulating means for controlling the upward movement of the body, a one way gripping device connected to the wheel and to the regulating means for permitting free movement of the flexible support in one direction, and a regulating movement in the opposite direction in accordance with the speed movement of the body.

4. A shock absorber secured to a body and to a flexible support comprising a frame, a rotatable wheel mounted in the frame, a windable belt connected to the wheel and to the flexible support, a spring for rotating the wheel in one direction, the body movement rotating it in the opposite direction, a regulating means for controlling the upward movement of the body, gears rotated by the belt and wheel for operating the regulating means, a one way gripping device formed in one of the gears for operating the said regulating means for permitting a free movement of the flexible support in one direction and a regulating movement in the opposite direction in accordance with the speed of movement of the said body.

5. A shock absorber secured to a body and to a flexible support, comprising a frame, a rotatable wheel mounted in the frame, a windable belt connected to the wheel and to the flexible support, a spring for rotating the wheel in one direction the body movement rotating it in the opposite direction, a sleeve mounted in the frame and on which the winding wheel is mounted, a shaft mounted in the sleeve and concentric with it, gears connecting the sleeve and the shaft, a one way gripping device in one of the gears, a governor operated by the shaft for retarding or regulating the upward movement of the body.

6. A shock absorber secured to a body and to a flexible support, comprising a frame, a rotatable wheel mounted in the frame, a windable belt connected to the wheel and to the flexible support, a spring for rotating the wheel in one direction the body movement rotating it in the opposite direction, a sleeve mounted in the frame and on which the winding wheel is mounted, a shaft mounted in the sleeve and concentric with it, gears connecting the sleeve and the shaft, a one way gripping device in one of the gears, a governor operated by the shaft, brake shoes secured to the governor, a casing against which the brake shoes operate for retarding or regulating the upward movement of the body, and means for adjusting the governor.

7. A shock absorber secured to a body and to a flexible support, comprising a frame, a rotatable wheel mounted in the frame, a windable belt connected to the wheel and to the flexible support, a spring for rotating the wheel in one direction the body movement rotating it in the opposite direction, a sleeve mounted in the frame and on which the winding wheel is mounted, a shaft mounted in the sleeve and concentric with it, gears connecting the sleeve and the shaft, a one way gripping device in one of the gears, a governor operated by the shaft, brake shoes secured to the governor, a casing against which the brake shoes operate for retarding or regulating the upward movement of the body, means for adjusting the governor, and adjustable springs connected to the governor weights and the shaft for regulating the thrust of the brake shoes.

HARLAND A. DANFORTH.